United States Patent
Kapocs et al.

(10) Patent No.: US 12,365,242 B2
(45) Date of Patent: Jul. 22, 2025

(54) ACCELERATOR PEDAL ASSEMBLY FOR A VEHICLE

(71) Applicant: Volvo Car Corporation, Gothenburg (SE)

(72) Inventors: Marcel Kapocs, Gothenburg (SE); Mickael Larsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/543,122

(22) Filed: Dec. 18, 2023

(65) Prior Publication Data
US 2024/0198796 A1 Jun. 20, 2024

(30) Foreign Application Priority Data
Dec. 16, 2022 (EP) ...................................... 22214326

(51) Int. Cl.
*B60K 26/02* (2006.01)
*B60R 21/02* (2006.01)
*G05G 1/30* (2008.04)
*G05G 1/32* (2008.04)

(52) U.S. Cl.
CPC .......... *B60K 26/02* (2013.01); *B60R 21/0286* (2013.01); *G05G 1/32* (2013.01)

(58) Field of Classification Search
CPC . G05G 1/30; G05G 1/32; G05G 1/327; B60K 26/02; B60K 2026/026; B60R 21/0286; B60R 21/09; B60T 7/065
See application file for complete search history.

(56) References Cited

U.S. PATENT DOCUMENTS

| | | | | |
|---|---|---|---|---|
| 6,327,930 | B1 * | 12/2001 | Ono | B60R 21/09 188/377 |
| 7,458,293 | B2 * | 12/2008 | Terradas | G05G 1/327 74/513 |
| 9,256,243 | B2 * | 2/2016 | Min | G05G 5/03 |
| 10,843,650 | B2 * | 11/2020 | Stough | B60K 23/02 |

(Continued)

FOREIGN PATENT DOCUMENTS

| | | | | |
|---|---|---|---|---|
| CN | 109278724 A | * | 1/2019 | |
| DE | 19652014 A1 | * | 6/1998 | B60K 23/00 |

(Continued)

OTHER PUBLICATIONS

Machine translation of DE 10306103 A1 obtained on Jan. 7, 2025.*
Search Report issued for European Application No. 22214326.5, mailed on Jun. 2, 2023, 8 pages.

*Primary Examiner* — Adam D Rogers
(74) *Attorney, Agent, or Firm* — Raj S. Dave; Davé Law Group, LLC

(57) ABSTRACT

According to an embodiment, it is an apparatus comprising a first bracket portion comprising a deformation element and a protruding surface, wherein the protruding surface is configured to support an accelerator pedal, wherein the deformation element is arranged in a deformation zone on the protruding surface, wherein the deformation element is configured to be deformed during a crash and lifting the accelerator pedal up by a predefined height away from the floor of a vehicle, and wherein the apparatus is an accelerator pedal bracket assembly for the vehicle for protecting a driver during the crash.

17 Claims, 5 Drawing Sheets

(56) References Cited

U.S. PATENT DOCUMENTS

2009/0293666 A1    12/2009  Kim et al.
2010/0132503 A1*   6/2010  Hong ..................... G05G 1/30
                                                            74/560
2024/0253601 A1*   8/2024  Kapocs ................... G05G 1/42

FOREIGN PATENT DOCUMENTS

DE        10306103 A1      9/2004
DE     102008046652 A1     4/2009
DE     102011051406 A1     1/2013
KR        101710542 B1 *   3/2017

* cited by examiner

ACCELERATOR PEDAL ASSEMBLY FOR A VEHICLE

CROSS-REFERENCE TO RELATED APPLICATIONS

This application claims the benefit of European Patent Application Number 22214326.5, filed on Dec. 16, 2022, which is hereby incorporated by reference in its entirety.

FIELD OF INVENTION

The present disclosure relates to an accelerator pedal assembly for a vehicle, and more particularly to an accelerator pedal bracket assembly for protecting a driver during a crash.

BACKGROUND

In a vehicle collision, the driver often still has his foot placed on an accelerator pedal of the vehicle. The G-force in such a collision may exert a high impact on the pedal and the foot thereon and thereby cause a severe injury to the driver during the collision.

Therefore, there is a need for a system in a vehicle in order to keep the risk caused by the vehicle collision and the extent of an injury to the driver's foot placed on an accelerator pedal at a minimum.

SUMMARY

The present disclosure relates to an accelerator pedal bracket assembly for a vehicle for protecting a driver during a crash, an accelerating pedal assembly for a vehicle for protecting a driver during a crash, a vehicle comprising an accelerator pedal bracket assembly, the use of an accelerator pedal bracket assembly for a vehicle and a method for protecting a driver by means of an accelerator pedal bracket assembly.

In a belted or unbelted vehicle collision accident, the driver often still has his foot placed on a pedal of the vehicle. The G-force in such a collision may exert a high impact on the pedal and the foot thereon. Statistically, the G-force exerted on the foot of the driver by such a collision may be as high as about 3500 N. However, at this force level, the pedal of the vehicle may not be completely damaged or deformed, so that the force pulse on the foot placed thereon may not be absorbed or reduced enough and thereby cause a severe injury of the driver during the collision. Moreover, the pedal may be damaged and fall apart into small pieces, resulting in further injuring the foot of the driver placed on the pedal. Hence, a sufficient protection system needs to be developed for the driving system of the vehicle, in order to keep the risk and the extent of an injury of the driver caused by the vehicle collision at a minimum.

It is an objective of the present disclosure to provide an improved pedal assembly for a vehicle for safety protection by a collision.

The problem is at least partially solved or alleviated by the subject matter of the independent claims of the present disclosure, wherein further examples are incorporated in the dependent claims.

According to a first aspect, there is provided an accelerator pedal assembly for a vehicle for protecting a driver during a crash. The accelerator pedal assembly comprises a first bracket portion, which comprises a deformation element and a protruding surface. The protruding surface is configured to support an accelerator pedal. The deformation element is arranged in a deformation zone on the protruding surface and configured to be deformed during the crash and to lift the accelerator pedal up by a predefined height.

The deformation element may be designed to be one or more recesses, slits or in combination, which may be formed on the protruding surface to facilitate the deformation in the deformation zone when compared to the zone on the protruding surface other than the deformation zone. Alternatively, the deformation element may be designed to be a protrusion on the protruding surface. Alternatively, the deformation element may be a resilient element that may be designed to lift the accelerator pedal up by means of the spring force of the resilient element during the crash.

By deforming the deformation element of the first bracket portion of the accelerator pedal bracket assembly, the high initial pulse of the collision, which may be for example around 3500 N on the foot, may be absorbed or brought down to a lower level and the injury caused by the crash may be prevented or at least kept at a minimum. Furthermore, by deforming the deformation element, the damage of the accelerator pedal may be minimized and the accelerator pedal may not fall into loose parts.

In an example, the first bracket portion may further comprise a base that may comprise at least one through hole and at least one retention element. The at least one through hole may be configured to secure the accelerator pedal to a floor panel of the vehicle by means of at least one fixing element.

The at least one retention element may be arranged at the at least one through hole.

The deformation elements and/or the retention elements may be cost-efficiently formed on the protruding surface of the pedal bracket, so that the optimized protection for the foot of the driver may be achieved during the crash without modifying the accelerator pedal itself.

In an example, the at least one retention element may comprise at least one sliding slot, which may be configured to elongate the at least one through hole in a first direction. The at least one sliding slot may be configured to allow the at least one fixing element sliding from the at least one through hole into the at least one sliding slot during the crash.

In an example, the at least one retention element may be configured to elongate the at least one through hole in parallel to each other. The at least one sliding slot may be configured to allow the at least one fixing element sliding from the at least one through hole into the at least one sliding slot in the same first direction during the crash.

The lateral translational movement, in addition to the vertical lifting up movement, of the accelerator pedal bracket assembly may further absorb and reduce the force exerted on the accelerator pedal and the foot thereon during the crash, resulting in minimized foot injury.

In an example, the at least one retention element may be configured to elongate the at least one through hole antiparallel to each other. Additionally, the at least one sliding slot may be configured to allow the at least one sliding slot sliding in opposite directions and thereby to allow the first bracket portion twisting by a predefined angle during the crash.

Similarly, the lateral twisting movement, in addition to the vertical lifting up movement, of the accelerator pedal bracket assembly may further absorb and reduce the force exerted on the accelerator pedal and the foot thereon during the crash, resulting in minimized foot injury.

In an example, the at least one retention element may further comprise at least one pivot element, which may be configured to pivot about the at least one through hole by the predefined angle during the crash.

Similarly, the lateral pivot or rotation movement, in addition to the vertical lifting up movement, of the accelerator pedal bracket assembly may further absorb and reduce the force exerted on the accelerator pedal and the foot thereon during the crash, resulting in minimized foot injury.

In an example, the at least one retention element may be configured to allow the sliding slot sliding into the sliding slot during the crash. Additionally, the at least one retention element may be configured to allow the pivot element pivoting by the predefined angle and thereby allow the first bracket portion twisting by the predefined angle during the crash.

In an example, the predefined height may be 1 mm to 2 mm.

In an example, the accelerator pedal bracket assembly may further comprise a second bracket portion, which may comprise the through hole and be configured to be at least partially overlaid by the first bracket portion.

The first bracket portion may be designed to be movable independently from the second bracket portion, so that the sliding slots of the first bracket portion may be configured to allow the respective fixing elements to slide or move in opposite directions.

In an example, the second bracket portion may be secured to the first bracket portion.

Alternatively, or additionally, the second bracket portion and the first bracket portion may be designed to be one piece.

The second bracket portion and the first bracket portion may form an integral piece of the accelerator pedal bracket, so that the accelerator pedal bracket may be lifted up, move or rotate as a whole piece.

In an example, the second bracket portion may further comprise the retention element, which may be the sliding slot.

The sliding slot of the second bracket portion may be configured to elongate the through hole of the second bracket portion in parallel to the at least one retention element of the first bracket portion, and thereby to allow the fixing element of the second bracket portion sliding from the through hole into the sliding slot in the same first direction as the at least one fixing element of the first bracket portion during the crash.

Alternatively, the sliding slot of the second bracket portion may be configured to elongate the through hole of the second bracket portion in a second direction different from the first direction, and to allow the fixing element of the second bracket portion sliding in the second direction, thereby to allow the second bracket portion twisting by the predefined angle, when the first bracket portion twisting by the predefined angle during the crash.

According to the second aspect, there is provided an accelerating pedal assembly for a vehicle for protecting a driver during a crash. The accelerating pedal assembly comprises an accelerator pedal and an accelerator pedal bracket assembly according to the present disclosure. The accelerator pedal bracket assembly is configured to secure the accelerator pedal to a floor panel of the vehicle and comprises a deformation element, which is configured to be deformed during the crash, so that the accelerator pedal and a foot of the driver are lifted up by a predefined height.

Alternatively, or additionally, the accelerator pedal bracket assembly may further comprise a first bracket portion, which may comprise at least one retention element comprising at least one sliding slot and/or at least one pivot element. The at least one sliding slot may be configured to allow the at least one fixing element, which may be configured to be arranged at the at least one through hole of the first bracket portion and attach the accelerator pedal to the floor panel, sliding from the at least one through hole into the at least one sliding slot or twisting by a predefined angle during the crash. The at least one pivot element may be configured to pivot about the at least one through hole by a predefined angle.

The accelerator pedal bracket assembly may be arranged between the accelerator pedal and the floor panel of the vehicle, so that the accelerator pedal may be designed to be a hanging pedal. This may advantageously allow the accelerator pedal and the foot of the driver placed on the accelerator pedal sliding off during a crash, so that the foot injury may be prevented or at least minimized, since the pulse of the crash on foot may fully or at least partly absorbed by the movable hanging accelerator pedal and the foot may be moved to a relatively stable and safe position during the crash.

Further, the accelerator pedal bracket assembly, the accelerator pedal and the foot may twist from a first position to a second position, so that the foot may be distant to the side panel of the vehicle with a predefined distance. As such, the foot may be prevented from a further injury caused by the side panel during the crash. A maximum predefined distance may be provided between the accelerator pedal and the side panel for preventing the foot from slipping off the accelerator pedal at the right side of the accelerator pedal. Moreover, the accelerator pedal may be configured to twist to guide the foot to the right side of the accelerator pedal for preventing the foot from slipping off the accelerator pedal at the left side of the accelerator pedal.

According to a third aspect, there is provided the use of an accelerator pedal bracket assembly according to the present disclosure for a vehicle according to the present disclosure for absorbing a crash impact and preventing a foot injury of a driver during a crash.

According to a fourth aspect, there is provided a vehicle comprising an accelerating pedal assembly according to the present disclosure, which comprises an accelerator pedal bracket assembly according to the present disclosure.

The accelerating pedal assembly and the accelerator pedal bracket assembly may be securely mounted to and/or integrated in the vehicle.

According to a fifth aspect, there is provided a method for protecting a driver during a crash for a vehicle by means of an accelerator pedal bracket assembly according to the present disclosure. The method comprises the following steps: first, providing a first bracket portion that comprises a deformation element and a protruding surface, and supporting an accelerator pedal by means of the protruding surface; subsequently, deforming the deformation element which is arranged in a deformation zone on the protruding surface during the crash, in order to lift the accelerator pedal up by a predefined height; finally, sliding or twisting the first bracket portion during the crash by means of at least one retention element, which comprises at least one sliding slot and/or at least one pivot element.

Further, there may be provided a computer program element for an accelerator pedal bracket assembly, which, when being executed by a processing element of a vehicle, is adapted to perform the method steps of the fifth aspect.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

It should be noted that the above examples may be combined with each other irrespective of the aspect involved. Accordingly, the method may be combined with structural features and, likewise, the apparatus and the system may be combined with features described above with regard to the method.

These and other aspects of the present disclosure will become apparent from and elucidated with reference to the examples described hereinafter.

According to an embodiment, it is an apparatus comprising a first bracket portion comprising a deformation element and a protruding surface, wherein the protruding surface is configured to support an accelerator pedal, wherein the deformation element is arranged in a deformation zone on the protruding surface, wherein the deformation element is configured to be deformed during a crash and lifting the accelerator pedal up by a predefined height away from the floor of a vehicle, and wherein the apparatus is an accelerator pedal bracket assembly for the vehicle for protecting a driver during the crash.

According to an embodiment, it is a system, comprising an accelerator pedal, and an accelerator pedal bracket assembly; wherein the accelerator pedal bracket assembly comprising a deformation element and is configured to secure the accelerator pedal to a floor panel of a vehicle; and wherein the deformation element is configured to be deformed during a crash, and provide at least one of a translational degree of freedom and a rotational degree of freedom to the accelerator pedal bracket assembly; and wherein the system is an accelerating pedal assembly for the vehicle configured for protecting a driver during the crash.

According to an embodiment, it is a method comprising providing an accelerator pedal bracket assembly comprising a first bracket portion comprising a deformation element and a protruding surface; supporting an accelerator pedal by the protruding surface; arranging the deformation element in a deformation zone on the protruding surface such that the deformation element is configured to deform during a crash, and provide at least one of a translational degree of freedom and a rotational degree of freedom to the accelerator pedal bracket assembly; and wherein the method is configured for protecting a driver during the crash of a vehicle.

BRIEF DESCRIPTION OF DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
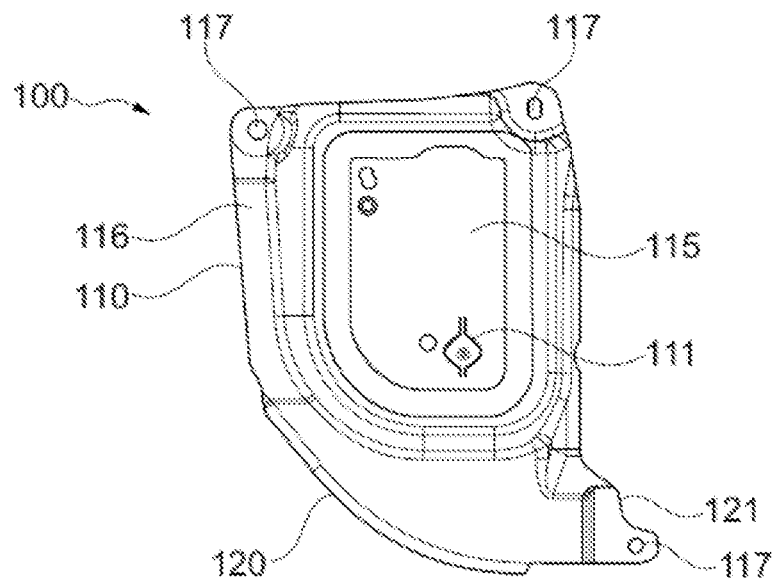
FIG. 1 shows schematically an example of an accelerator pedal bracket assembly according to the present disclosure.
Figure 5A:
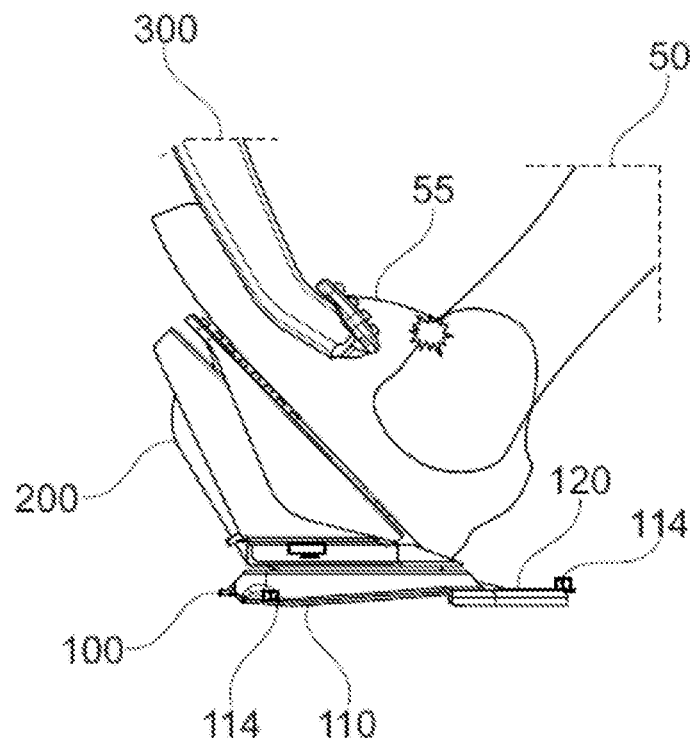
FIG. 5a shows schematically a side view of an example of an accelerating pedal assembly according to the present disclosure.
Figure 5B:
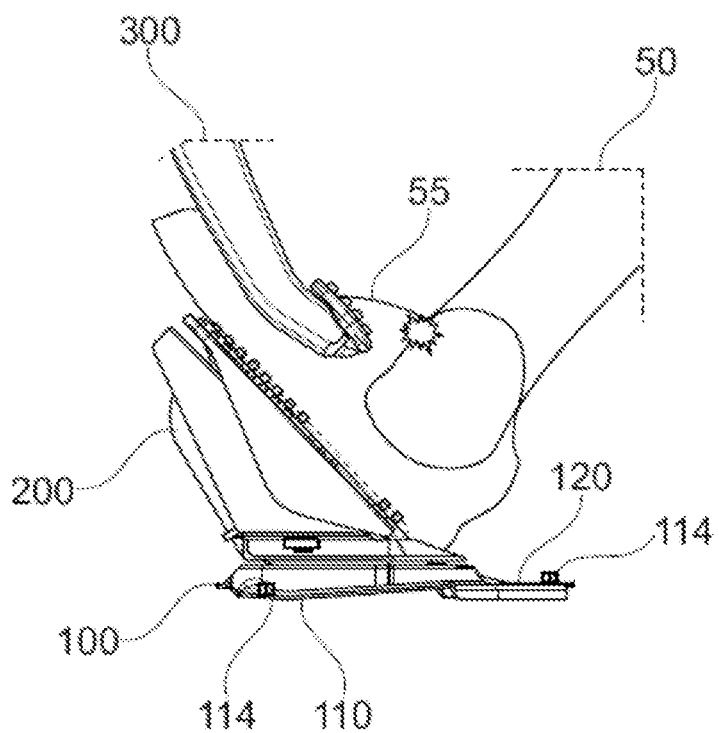
FIG. 5b shows schematically a side view of an example of an accelerating pedal assembly according to the present disclosure.
Figure 6:
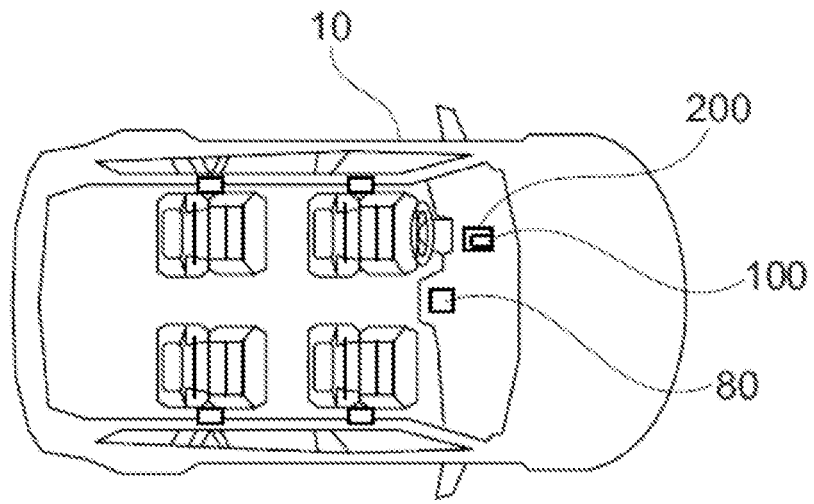
FIG. 6 shows schematically an example of a vehicle according to the present disclosure.

FIG. 1 shows an accelerator pedal bracket assembly 100 for a vehicle 10, which is shown in FIG. 6, for protecting a driver 50 (shown in FIG. 5a, 5b) during a crash. The accelerator pedal bracket assembly 100 comprises a first bracket portion 110 and a second bracket portion 120.

The first bracket portion 110 comprises a deformation element 111 and a protruding surface 115. The deformation element 111 is arranged in a deformation zone on the protruding surface 115. The deformation element 111 may be designed to be one or more recesses, slits or in combination, which may be formed on the protruding surface 115 to facilitate the deformation in the deformation zone when compared to the zone of the protruding surface 115 other than the deformation zone.

Figure 4A:
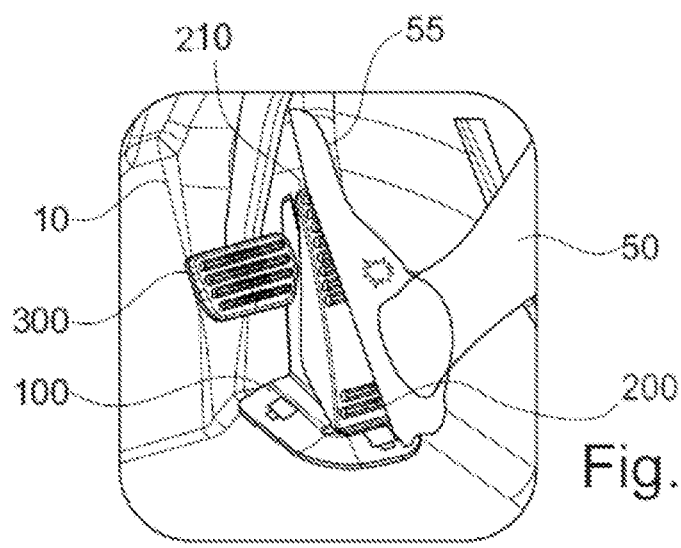
FIG. 4a shows schematically a perspective view of an example of an accelerating pedal assembly according to the present disclosure.
Figure 4B:
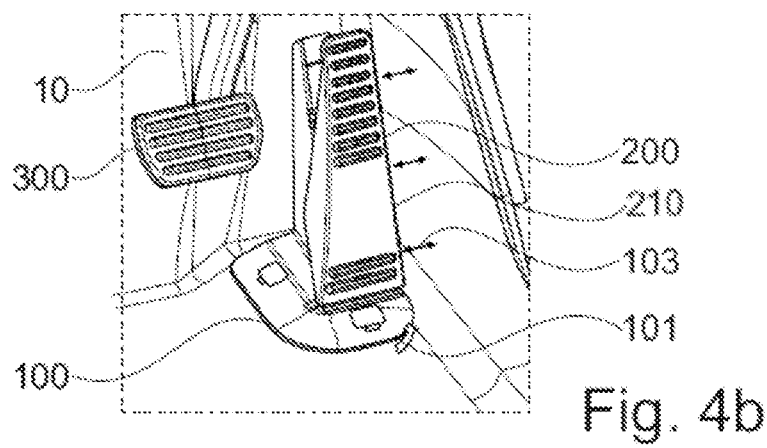
FIG. 4b shows schematically a perspective view of an example of an accelerating pedal assembly according to the present disclosure.
Figure 4C:
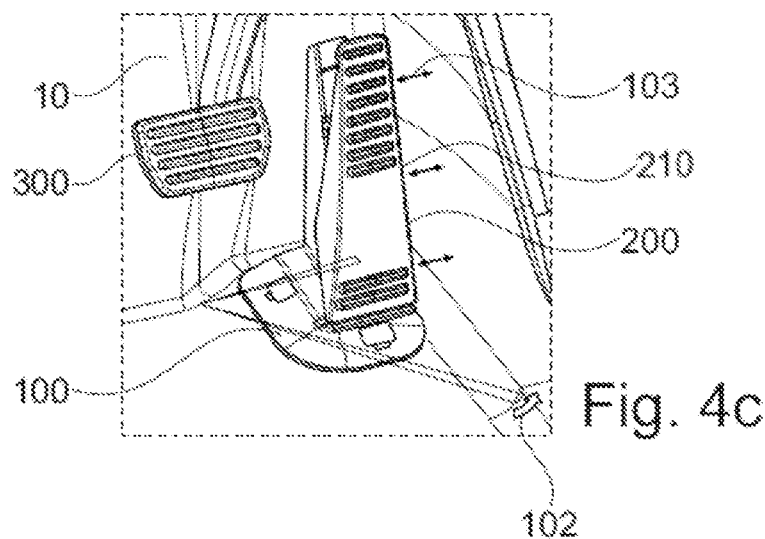
FIG. 4c shows schematically a perspective view of an example of an accelerating pedal assembly according to the present disclosure.

The protruding surface 115 may be configured to support an accelerator pedal 210, as shown in FIG. 4a to FIG. 4c, of the vehicle 10.

The protruding surface 115 may be designed to be in a substantially rectangular form, which may correspond to the bottom surface of an accelerator pedal 210. The deformation zone for the deformation element is arranged in a zone in one of the corners of the protruding surface 115. Alternatively, the deformation zone may be arranged in the center zone of the protruding surface 115.

The deformation element 111, may be configured to be deformed during the crash and to lift the accelerator pedal 210 up by a predefined height 101. For example, the defined height 101 may be 1 mm to 2 mm.

By deforming the deformation element 111 of the first bracket portion 110 of the accelerator pedal bracket assembly 100, the high initial pulse of the collision, which may be around 3500 N on the foot 55 may be absorbed or brought down to a lower level and the injury caused by the crash may be prevented or at least kept at a minimum. Furthermore, by deforming the deformation element 111, the damage of the accelerator pedal 210 may be minimized and the accelerator pedal 210 may not fall into loose parts.

Moreover, the deformation element 111 may be cost-efficiently formed on the protruding surface 115 of the pedal bracket without modifying the accelerator pedal 210 itself.

Figure 3A:
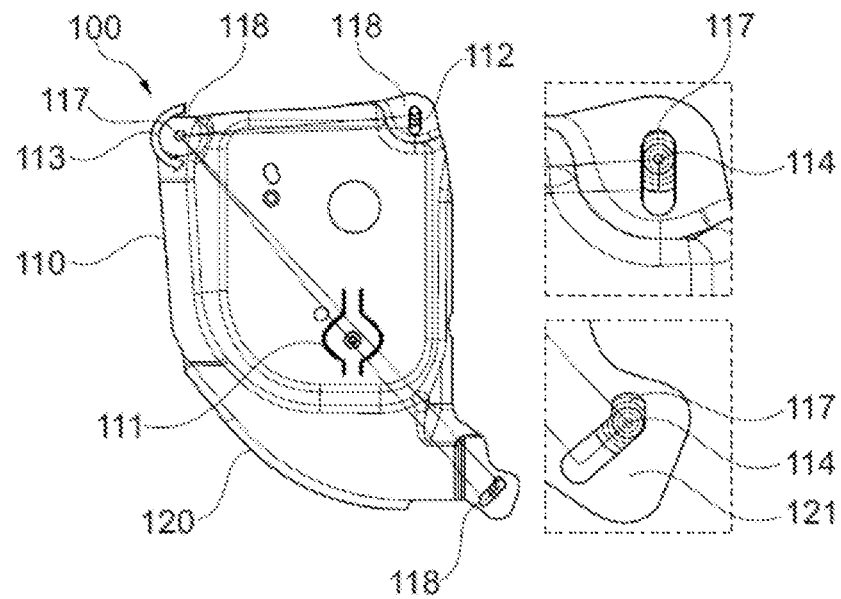
FIG. 3a shows schematically an example of an accelerator pedal bracket assembly according to the present disclosure.
Figure 3B:
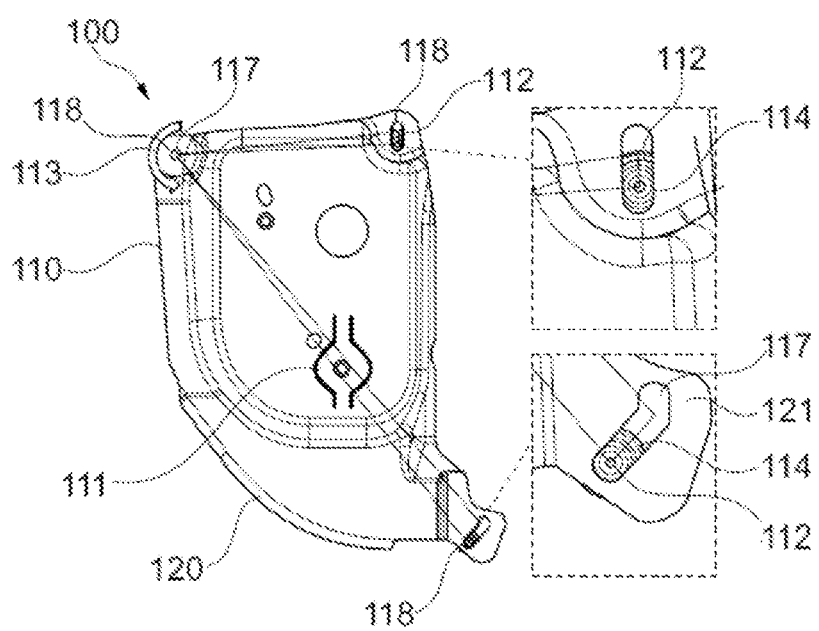
FIG. 3b shows schematically an example of an accelerator pedal bracket assembly according to the present disclosure.

The first bracket portion 110 of the accelerator pedal bracket assembly 100 further comprises a base 116, which comprises at least one through hole 117. The at least one through hole 117 may be configured to secure the accelerator pedal 210 to a floor pedal of vehicle 10 by means of at least one fixing element as shown in FIG. 3a and FIG. 3b, such as at least one screw or at least one pin. In FIG. 1, two through holes 117 are provided, respectively, in the two corners of the first bracket portion 110 to allow the accelerator pedal 210 being fixed to the floor panel of the vehicle 10.

The second bracket portion 120 of the accelerator pedal bracket assembly 100 comprises an extending portion 121 and the through hole 117 that is arranged in the extending portion 121.

The second bracket portion 120 may be secured to the first bracket portion 110. For example, the second bracket portion 120 and the first bracket portion 110 may be designed to be one piece, so that the second bracket portion 120 and the first bracket portion 110 may be movable as a whole during the crash.

Alternatively, the second bracket portion 120 may be designed to be at least partially overlaid by the first bracket portion 110, so that only the first bracket portion 110 may be movable during the crash.

Figure 2:
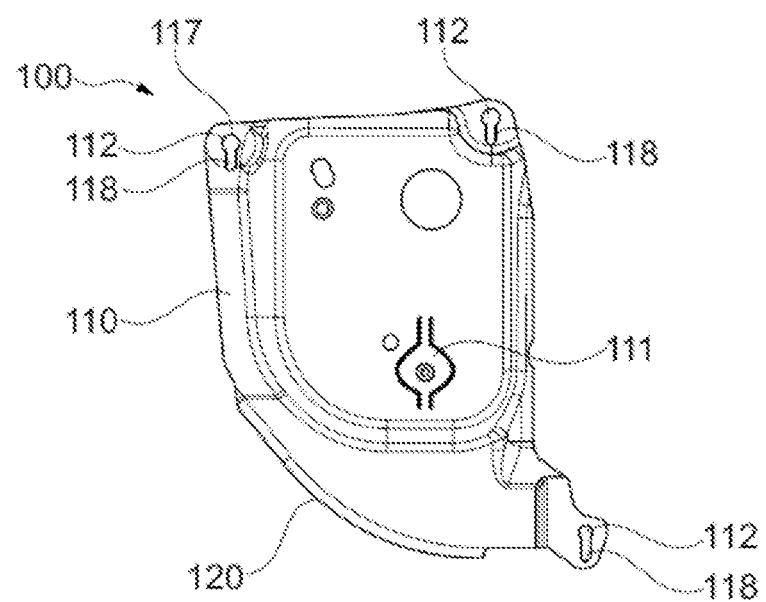
FIG. 2 shows schematically an example of an accelerator pedal bracket assembly according to the present disclosure.

In contrast to the accelerator pedal bracket assembly 100 of FIG. 1, the base 116 of the first bracket portion 110 of the accelerator pedal bracket assembly 100 in FIG. 2 further comprises at least one retention element 118, which are arranged at the at least one through hole 117. As shown in FIG. 2, two retention elements 118 are provided, respectively, at the two through holes 117 of the base 116 of the first bracket portion 110. Additionally, a further retention element 118 is arranged at the through hole 117 of the second bracket portion 120.

The at least one retention element 118 may comprise at least one sliding slot 112 that may elongate or extend the at least one through hole 117. For example, in FIG. 2, three sliding slots 112 are provided, respectively, at the three corresponding retention elements 117. As the second bracket portion 120 may be secured to the first bracket portion 110 or formed as an integral piece with the first bracket portion 110, the sliding slots 112 may be configured to allow the respective fixing elements 114 to slide from the respective through holes 117 into the sliding slots 112 during the crash.

All three sliding slots 112 are designed to elongate the respective through holes 117 in the same direction, namely a first direction. In this way, the retention elements 118 may be configured to elongate the through holes 117 in parallel to each other. Accordingly, the sliding slots may be configured to allow the fixing elements 114 to slide or move from the through holes 117 into the sliding slots 112 in the same first direction, so that the bracket assembly 100 may be moved translationally as a whole piece from a first position to a second position.

Alternatively, the two retention elements 118 of the first bracket portion 110 may be configured to elongate the through holes 117 antiparallel to each other. If the first bracket portion 110 is designed to be movable independently from the second bracket portion 120, the sliding slots 112 of the first bracket portion 110 may be configured to allow the respective fixing elements 114 to slide or move in opposite directions. Accordingly, the first bracket portion 110 may twist or pivot by a predefined angle 102, e.g. as shown in FIG. 4c, by a predefined angle during the crash.

Alternatively, the at least one retention element 118 may further comprise at least one pivot element 113, which may be configured to pivot about the at least one through hole 117 by a predefined angle 102 during the crash.

FIG. 3a and FIG. 3b show, respectively, that the retention elements 118 of the first bracket portion 110 may comprise a sliding slot 112 at one of the two through holes 117 and a pivot element 113 at the other of the two through holes 117. The retention element 118 of the second bracket portion may, for example, be a sliding slot 112. Since the pivot element 113 may be configured to pivot about the respective though hole 117, for example counterclockwise, by a predefined angle 102 during the crash. Accordingly, by the crash, the sliding slot 112 of the first bracket portion 110 and the sliding slot 112 of the second bracket portion 120 may allow the respective fixing elements 114 to slide from the respective through holes 117 into the sliding slots 112. Simultaneously, the pivot element 113 may pivot counterclockwise by the predefined angle and the first bracket portion 110 may twist by the corresponding predefined angle 102. The counterclockwise pivot direction may ensure that the accelerator pedal 210 and the foot 55 placed thereon may twist from a first position to a second position, so that the foot 55 during the crash may not be further injured by a brake pedal 300 as shown in FIG. 4a to FIG. 4c that is typically provided on the left side of the accelerator pedal 210.

In FIG. 3a and FIG. 3b, the sliding slot 112 of the second bracket portion 120 may elongate the respective through hole 117 in a second direction that may differ from the first elongation direction of the sliding slot 112 of the first bracket portion 110. The second bracket portion 120 may be secured to the first bracket portion so that the pedal bracket 100 may twist as a whole piece.

Since the pedal bracket assembly may allow the accelerator pedal 210 and the foot 55 placed thereon to slide, rotate or twist from the first position into the second position during the crash, in addition to being lifted up by the deformation element 111, the crash force or the crash pulse on the accelerator pedal 210 and the foot 55 may further be absorbed and reduced and the extent of the foot injury of the driver may thus be further minimized.

FIG. 4a to FIG. 4c and FIG. 5a to FIG. 5c show, respectively, an accelerating pedal assembly 200 for protecting a driver 50 during a crash in a perspective view and a side view.

The accelerating pedal assembly 200 comprises an accelerator pedal 210, which is arranged on the right side to a brake pedal 300 and on which the foot 55 of the driver 50 may be placed, and an accelerator pedal bracket assembly 100 which is shown in FIG. 1 to FIG. 3 for example.

The accelerator pedal bracket assembly 100 may be configured to secure the accelerator pedal 210 to a floor panel of the vehicle 10 by means of at least one fixing element 114, so that the accelerator pedal 210 may be designed to be a flexible hanging pedal 210. The fixing elements 114 may be provided at the through holes 117 of the accelerator pedal bracket assembly 100.

The accelerator pedal bracket assembly 100 may comprise a deformation element 111 which may be configured to allow the accelerator pedal 210 and the foot 55 thereon being lifted up by a predefined height 101, as shown in FIG. 4b, and/or at least one retention element 118 which may be configured to allow the accelerator pedal 210 and the foot twisting by a predefined angle 102, as shown in FIG. 4c.

The accelerator pedal bracket assembly 100, the accelerator pedal 210 and the foot 55 may twist from a first position to a second position where the foot 55 may be distant to the side panel of the vehicle with a predefined distance 103, as shown in FIG. 4b and FIG. 5b, so that the foot 55 may be prevented from a further injury caused by the side panel during the crash. A maximum predefined distance 103 between the accelerator pedal 210 and the side panel may prevent the foot 55 from slipping off the accelerator pedal 210 at the right side of the accelerator pedal 210. Moreover, the accelerator pedal 210 may twist to guide the foot 55 to the right side of the accelerator pedal 210, in order to prevent the foot 55 to slip off the accelerator pedal 210 at the left side of the accelerator pedal 210.

FIG. 6 shows that the vehicle 10 comprises an accelerating pedal assembly 200 according to the present disclosure. The accelerating pedal assembly 200 may comprise an accelerator pedal bracket assembly 100 according to the present disclosure and a processing element 80, which may be designed to execute a computer program element for the vehicle 10 for performing method steps as shown in FIG. 7.

Figure 7:
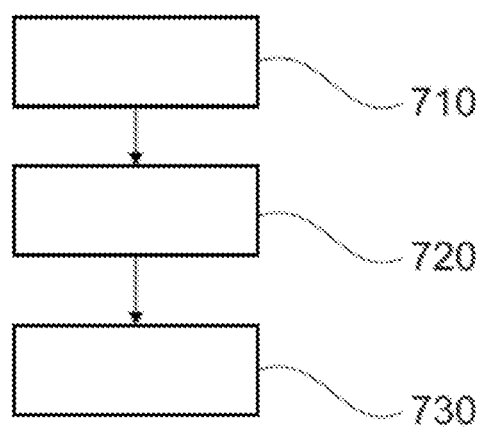
FIG. 7 shows schematically a flow chart illustrating a method for soundproofing in a vehicle by means of an audio controlling system according to the present disclosure.

FIG. 7 shows a flow chart illustrating a method for protecting a driver 50 during a crash for a vehicle 10 by means of an accelerator pedal bracket assembly 100. The method starts at step 710 where a first bracket portion 110 comprising a deformation element 111 and a protruding surface 115 may be provided and an accelerator pedal 210 may be supported by means of the protruding surface 115. At a subsequent step 720, the deformation element 111, which is arranged in a deformation zone on the protruding surface 115, may be deformed during the crash, in order to lift the accelerator pedal 210 up by a predefined height 101. Finally, at step 730, the first bracket portion 110 may be able to slide or twist during the crash by means of at least one retention element 118 that may comprise at least one sliding slot 112 and/or at least one pivot element 113.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

The term "rotational degree of freedom" refers to the ability of an object to rotate around a specific axis.

The term "translational degree of freedom" refers to the ability of an object to move in a linear direction along a specific axis. Degrees of freedom (DOF) are a measure of the ways in which a rigid body can move in three-dimensional space.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS 10 vehicle
50 driver
55 foot of driver
80 processing element
100 accelerator pedal bracket assembly
101 predefined height
102 predefined angle
110 first bracket portion
111 deformation element
112 sliding slot
113 pivot element 114 fixing element
115 protruding surface
116 base
117 through hole
118 retention element
120 second bracket portion
121 extending portion
200 accelerating pedal assembly
210 accelerator pedal
300 brake pedal
710 step of providing first bracket portion
720 step of deforming deformation element
730 step of sliding or twisting first bracket portion

What is claimed is:

1. An apparatus comprising:
a first bracket portion comprising a deformation element and a protruding surface, and a base;
wherein the protruding surface is configured to support an accelerator pedal;
wherein the deformation element is arranged in a deformation zone on the protruding surface;
wherein the deformation element is configured to be deformed during a crash and lifting the accelerator pedal up by a predefined height away from a floor panel of a vehicle; and
wherein the apparatus is an accelerator pedal bracket assembly for the vehicle for protecting a driver during the crash; and
wherein the base comprises,
at least one through hole, wherein the at least one through hole is configured to secure the accelerator pedal to the floor panel of the vehicle by means of at least one fixing element; and
at least one retention element, wherein the at least one retention element is arranged at the at least one through hole.

2. The apparatus of claim 1, wherein the at least one retention element further comprises at least one sliding slot; and wherein the at least one sliding slot is configured to elongate the at least one through hole in a first direction; and wherein the at least one sliding slot is configured to allow the at least one fixing element sliding from the at least one through hole into the at least one sliding slot during the crash.

3. The apparatus of claim 2, wherein the at least one retention element is configured to elongate the at least one through hole in parallel to the at least one retention element; and wherein the at least one sliding slot is configured to allow the at least one fixing element sliding from the at least one through hole into the at least one sliding slot in the first direction during the crash.

4. The apparatus of claim 2, wherein the at least one retention element is configured to elongate the at least one through hole antiparallel to the at least one retention element; and wherein the at least one sliding slot is configured to allow the at least one sliding slot sliding in opposite directions and thereby to allow the first bracket portion twisting by a predefined angle during the crash.

5. The apparatus of claim 4, wherein the at least one retention element further comprising at least one pivot element; and wherein the at least one pivot element is configured to pivot about the at least one through hole by the predefined angle during the crash.

6. The apparatus of claim 5, wherein the at least one retention element is configured to allow the at least one sliding slot is configured to allow the at least one fixing element sliding from the at least one through hole into the at least one sliding slot during the crash; and wherein the at least one retention element is configured to allow the pivot element pivoting by the predefined angle and thereby allow the first bracket portion twisting by the predefined angle during the crash.

7. The apparatus of claim 1, wherein the predefined height is in a range of 1 mm to 2 mm.

8. The apparatus of claim 1, wherein the apparatus further comprises a second bracket portion; and wherein the second bracket portion comprises a through hole and wherein the second bracket portion is configured to be at least partially overlaid by the first bracket portion.

9. The apparatus of claim 8, wherein the second bracket portion is secured to the first bracket portion.

10. The apparatus of claim 8, wherein the second bracket portion and the first bracket portion are configured to act as one piece.

11. The apparatus of claim 8, wherein the second bracket portion further comprising a retention element, wherein the retention element of the second bracket portion is a sliding slot; and wherein the sliding slot of the second bracket portion is configured to elongate the through hole of the second bracket portion in parallel to the at least one retention element of the first bracket portion, and thereby to allow a fixing element of the second bracket portion sliding from the through hole into the sliding slot in a first direction as the at least one fixing element of the first bracket portion during the crash.

12. The apparatus of claim 11, wherein the sliding slot of the second bracket portion is configured to elongate the through hole of the second bracket portion in a second direction different from the first direction, and to allow the fixing element of the second bracket portion sliding in the second direction, thereby to allow the second bracket portion twisting by a predefined angle along with the first bracket portion when the first bracket portion is twisting by the predefined angle during the crash.

13. A system, comprising:
an accelerator pedal, and
an accelerator pedal bracket assembly;
wherein the accelerator pedal bracket assembly comprising a deformation element and is configured to secure the accelerator pedal to a floor panel of a vehicle; and
wherein the deformation element is configured to be deformed during a crash, and provide at least one of a translational degree of freedom and a rotational degree of freedom to the accelerator pedal bracket assembly; and
wherein the system is an accelerating pedal assembly for the vehicle configured for protecting a driver during the crash; and
wherein the translational degree of freedom is where the deformation element is configured for lifting the accelerator pedal up by a predefined height away from the floor panel of the vehicle; and wherein the rotational degree of freedom is where the deformation element is configured for twisting a first bracket portion of the accelerator pedal bracket assembly during the crash away from a brake pedal.

14. The system of claim 13, wherein the accelerator pedal along with a foot of the driver placed on the accelerator pedal are lifted up by the predefined height.

15. The system of claim 13, wherein the system is configured to be a component of the vehicle.

16. The system of claim 13, wherein the accelerator pedal bracket assembly is configured for absorbing an impact of the crash and preventing a foot injury of the driver during the crash.

17. A method comprising:
providing an accelerator pedal bracket assembly comprising a first bracket portion comprising a deformation element and a protruding surface;
supporting an accelerator pedal by the protruding surface;
arranging the deformation element in a deformation zone on the protruding surface such that the deformation element deforms during a crash, and provide at least one of a translational degree of freedom and a rotational degree of freedom to the accelerator pedal bracket assembly; and
wherein the method is configured for protecting a driver during the crash of a vehicle; and
wherein the translational degree of freedom is where the deformation element is configured for lifting the accelerator pedal up by a predefined height away from a floor panel of the vehicle; and wherein the rotational degree of freedom is where the deformation element is configured for twisting the first bracket portion during the crash away from a brake pedal.

* * * * *